(12) United States Patent
Shaw et al.

(10) Patent No.: US 10,859,359 B1
(45) Date of Patent: Dec. 8, 2020

(54) ADDITIVELY MANUFACTURED MECHANICAL MULTISTAGE IGNITION SEQUENCER

(71) Applicant: BAE SYSTEMS Information and Electronic Systems Integration Inc., Nashua, NH (US)

(72) Inventors: Michael J. Shaw, Epsom, NH (US); Benjamin K. Campbell, Nashua, NH (US); Ryan Dippel, Arlington, MA (US); Matthew M. Hall, Nashua, NH (US); Andrew Kaye, Alamo, CA (US); John A. Mitchell, Amherst, NH (US); William R. Samuels, Wilton, NH (US); Timothy W. Spence, Hollis, NH (US); Heather A. Wickman, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 103 days.

(21) Appl. No.: 16/412,539

(22) Filed: May 15, 2019

(51) Int. Cl.
*F42C 15/188* (2006.01)

(52) U.S. Cl.
CPC .................. *F42C 15/188* (2013.01)

(58) Field of Classification Search
CPC ...... F42C 15/196; F42C 15/192; F42C 15/18; F42C 15/16; F42C 15/005; F42C 15/00
USPC ........................................................ 102/254
See application file for complete search history.

(56) References Cited

U.S. PATENT DOCUMENTS

| | | | | |
|---|---|---|---|---|
| 3,786,759 A * | 1/1974 | Mellen | ................. | F42C 15/188 102/235 |
| 5,003,881 A | 4/1991 | Herold et al. | | |
| 5,216,196 A * | 6/1993 | Anderson | ............. | F42C 15/188 102/235 |
| 5,275,107 A * | 1/1994 | Weber | ................. | F42C 15/188 102/229 |
| 5,561,259 A * | 10/1996 | Herbage | ................. | F42B 5/08 102/251 |
| 6,634,301 B1 * | 10/2003 | Mulinix | ................. | F42B 4/26 102/229 |
| 8,430,031 B1 * | 4/2013 | Thorniley | ............... | F42C 15/20 102/337 |
| 2011/0056401 A1 * | 3/2011 | Aliaghai | ............... | F42C 15/188 102/251 |

* cited by examiner

*Primary Examiner* — John Cooper
(74) *Attorney, Agent, or Firm* — KPIP Law, PLLC (57) ABSTRACT

The system and method for forming an ignition sequencer comprising two inseparable portions (a body and an armature) where an armature is articulable with respect to a body to allow for the existence of no less than two distinct stages of the ignition sequence through the articulating motion of the additively-manufactured armature. The ignition sequencer assembly architecture allows for installation of an internal energetic compound while all components are assembled and interconnected. The ignition sequencer assembly architecture allows for installation into a next higher-level assembly using a single, uniaxial, force.

13 Claims, 9 Drawing Sheets

ADDITIVELY MANUFACTURED MECHANICAL MULTISTAGE IGNITION SEQUENCER

STATEMENT OF GOVERNMENT INTEREST

This disclosure was made with United States Government support under Contract No. N00104-16-G-0726/0002 awarded by the United States Navy. The United States Government has certain rights in this disclosure.

FIELD OF THE DISCLOSURE

The present disclosure relates to ignition sequencers and more particularly to a mechanical multistage ignition sequencer with a reduced part count and reduced points of failure produced via additive manufacturing.

BACKGROUND OF THE DISCLOSURE

In general, ignition sequencers are devices that are used to precisely control the timing sequence of the ignition process in several types of systems including, signal flares, expendable infrared (IR) decoys, rocket motors, missiles, munitions, and other energetic applications. Ignition sequencers tend to be either of the mechanical or electrical variety. Mechanical sequencers are typically less complex and have higher reliability. They generally consist of several individual components that are assembled together with relative motion between them to perform the sequencing action after a given user input. In areas of production that call for high volume, sequencers that are comprised of several individual components often increase cost and provide the opportunity for multiple points of failure.

Often these devices are used in mission-critical or even life-critical applications, so performance of the ignition sequencer is crucial. Additionally, the complexity of some of these component designs, give rise to potential manufacturing defects that impact quality and system performance.

Wherefore it is an object of the present disclosure to overcome the above-mentioned shortcomings and drawbacks associated with the conventional mechanical ignition sequencers.

SUMMARY OF THE DISCLOSURE

One aspect of the present disclosure is an ignition sequencer assembly, comprising: a body comprising a guide slot and an energetic well; and an armature, wherein the armature is captively contained by the body and exhibits relative articulating motion with respect thereto and comprises a single, monolithic, paddle structure which acts to open and close two or more ignition apertures; the armature having a top plate, the top plate comprising: a top aperture; a lock for slidably engaging with the guide slot; and a spring catch; a bottom plate, the bottom plate comprising: a lobed portion; and a bottom aperture; and a lever, wherein the lever connects the top plate to the bottom plate.

One embodiment of the ignition sequencer assembly is wherein the body and the armature are additively-manufactured.

Another embodiment of the ignition sequencer assembly is wherein the ignition sequencer assembly architecture allows for the existence of two or more distinct stages of the ignition sequence through the articulating motion of the additively-manufactured armature.

In certain embodiments, the body is additively-manufactured from a polyamide material. In some cases, the armature is additively-manufactured from a polyamide material.

Yet another embodiment of the ignition sequencer assembly is wherein the ignition sequencer assembly architecture allows for installation of an internal energetic compound while all components are assembled and interconnected. In certain embodiments the ignition sequencer assembly architecture allows for installation into a next higher-level assembly using a single, uniaxial, force. In some cases, integral flexure locking features retain the ignition sequencer assembly in the next higher level assembly.

Still yet another embodiment of the ignition sequencer assembly is wherein the ignition sequencer assembly comprising features designed to limit accessible positions of relative motion between the body and the armature during operation.

In one embodiment when the ignition sequencer is in an energetic load position the energetic well is unobstructed by the top and bottom apertures. In another embodiment, when the ignition sequencer is in an ignite position the bottom aperture is aligned with the energetic well and the lock is in the guide slot. In yet another embodiment, when the ignition sequencer is in a fire position the top aperture is aligned with the energetic well and the lobed portion is some distance away from an inner wall of the body such that the bottom aperture is no longer aligned with the energetic well.

Another aspect of the present disclosure is a method of using an ignition sequencer assembly, comprising: providing a body comprising a guide slot and an energetic well and an armature, wherein the armature is captively contained by the body; articulating the armature with respect to the body, the armature comprising a single, monolithic, paddle structure the armature having a top plate, the top plate comprising: a top aperture; a lock for slidably engaging with the guide slot; and a spring catch; a bottom plate, the bottom plate comprising: a lobed portion; and a bottom aperture; and a lever, wherein the lever connects the top plate to the bottom plate; and opening and closing two or more ignition apertures with the articulating motion o gf the armature with respect to the body.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

One embodiment of the multistage ignition sequencer of the present disclosure can only be fabricated through the use of additive layer-wise fabrication methods. This design reduces the original assembly part count (as shown in t FIG. 1A-FIG. 1D) from thirteen individual components to only two components (See, e.g., FIG. 2A), thereby significantly reducing cost (e.g., 40+% cost reduction). This reduction in part number also reduced potential sources of failure. Additionally, the use of additive manufacturing (AM) technology eliminates high-cost, non-recurring engineering costs associated with design and fabrication of custom tooling.

One embodiment of the multistage ignition sequencer is 3D-printed with two distinctly different regions that are captive to each other but provide articulating relative motion. Although relative motion exists, the two pieces could never be assembled or disassembled. This design for the multistage ignition sequencer is only achievable with additive manufacturing. The new design also incorporates several complex features that would be impossible to produce in any other fashion but are critical to achieving the desired system performance.

One embodiment of the ignition sequencer of the present disclosure can close/open different ignition apertures on either end of the device with the movement of a single piece (the armature) which is captively connected to the body of the sequencer. Prior designs relied on separate multi-piece sub-assemblies to control individual apertures.

Figure 1A:
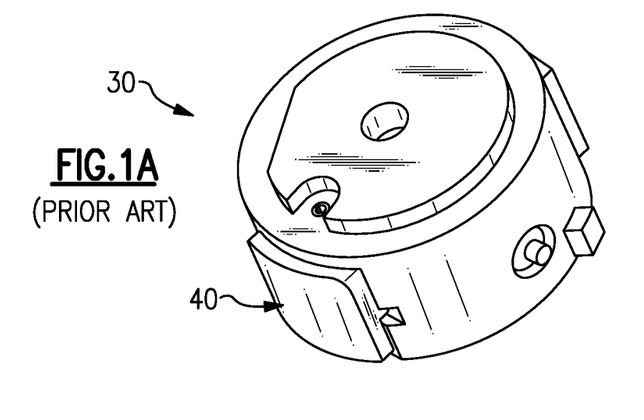
FIG. 1A and FIG. 1B are top views of a prior art ignition sequencer in an ignite and a fire configuration, respectively.
Figure 1B:
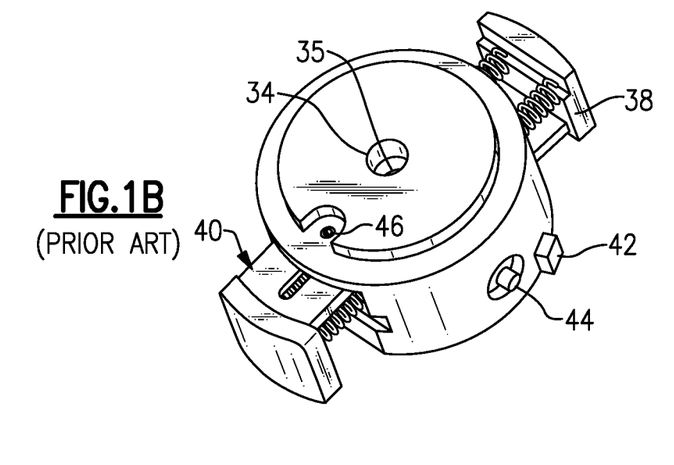
Figure 1C:
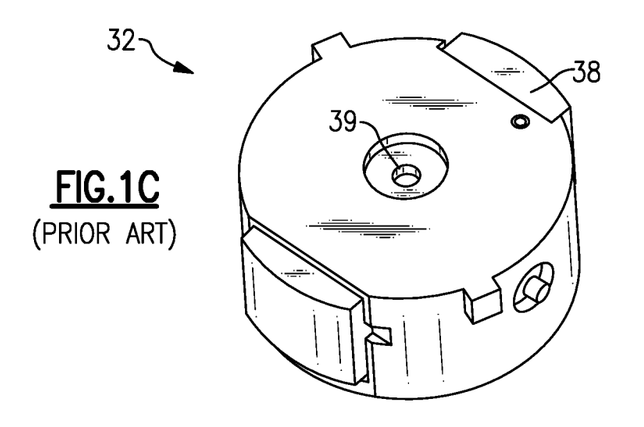
FIG. 1C and FIG. 1D are bottom views of a prior art ignition sequencer in an ignite and a fire configuration, respectively.

Referring to FIG. 1A and FIG. 1C, top and bottom views 30 and 32, respectively, of a prior art ignition sequencer in an "ignite" configuration, are shown. During an ignition event, the sequencer is initially in the "ignite" configuration, as seen in FIGS. 1A and 1C. There you see that in the top view (FIG. 1C the aperture on the top is closed off via inner arm 40. The flare sequencer is properly oriented to the flare body using alignment features 42 and locked and retained into the flare body with spring-loaded locking pins 44. The compression of inner arm 40 and outer arm 38 by the flare canister defines the "ignite" configuration. Hot gases and particulates, originating from an electrically-controlled impulse cartridge, enter into the interior of the ignition sequencer body through an aperture 36 in the bottom of the sequencer body via a small aperture 39 in the outer arm 38 which is aligned with the ignition sequencer body in the "ignite" configuration and the intermediary charge found within the interior of the ignition sequencer body is lit. This is shown in FIG. 1C. Simultaneously, expelled energy from the impulse cartridge propels the flare assembly out from the flare canister.

Figure 1D:
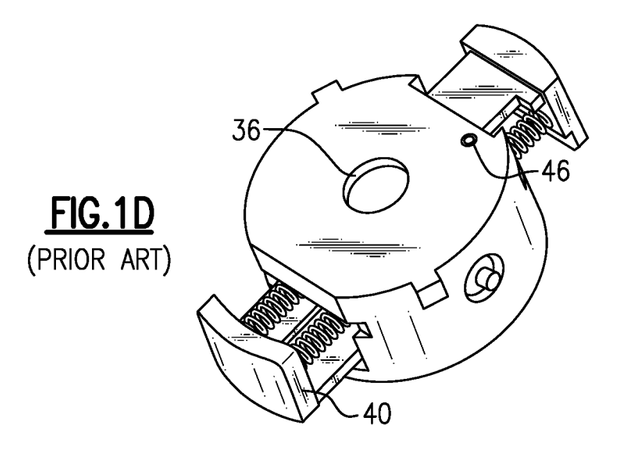

Referring to FIG. 1B and FIG. 1D, top and bottom views 30 and 32, respectively, of a prior art ignition sequencer in a "fire" configuration are shown. As the flare assembly exits the canister, spring-loaded inner arm 40 and outer arm 38, no longer restricted by the canister, expand outward. Retention pin 46 prevents inner arm 40 and outer arm 38 from completely separating from sequencer assembly. The extension of inner arm 40 and outer arm 38 define the "fire" configuration. In this configuration, the aperture 39 in outer arm 38 which was once aligned with an aperture 36 in the bottom of the sequencer body is now closed off (See, e.g., FIG. 1D). Conversely, a small aperture 35 located in inner arm 40 is now aligned with the aperture 34 in the top of the sequencer body and hot gases and particulates, originating from the intermediary charge found within the sequencer's interior, are directed into the flare body toward the primary flare energetic grain. As the primary grain is ignited, pressure created from hot burning gases forces the ignition sequencer locking pins 44 to shear and eject the ignition sequencer assembly from the main flare body assembly.

One embodiment of the present disclosure results in a lower part count (See, e.g., FIG. 2A), increased reliability, reduced interfaces, less touch labor, and the like. Some benefits to the present disclosure are the elimination of tooling cost, a significant reduction in recurring material costs; significant reduction in part count and potential sources of failure; and proven quality and reliability of AM material and processes in target application space.

In certain embodiments, a flare, or the like is launched from an aircraft and provides an IR signature which enhances the aircraft's survivability against IR threats. In some cases, a countermeasure controller sends a signal and power to a countermeasure dispenser and an explosive cap is lit whereby the energy ejects the flare and ignites an intermediary charge found in the ignition sequencer. At such time the flare is completely ejected from the flare canister and the ignition sequencer then ignites the main flare charge.

In an exemplary flare, a canister may contain an explosive cap or impulse cartridge used to transfer force and energy to an ignition sequencer which in turn transfers that force to a flare at the appropriate time. In some cases, the transfer of force is via a piston. In addition to the flare assembly, there is generally also a cover assembly that is sealed in place. In some cases, the primary structure of the flare comprises an epoxy composite flare housing/body with a copper tungsten nose attached at one end and a nozzle at the opposite end. The pyrotechnic insert/grain is contained inside the flare assembly. A sequencer assembly being located behind the nozzle. The sequencer assembly contains a pyrotechnic pellet designed to ignite from exposure to hot impulse cartridge gases.

It is important that the ignition sequencer not ignite the flare when it is still in the magazine (or aircraft). It must withstand extremely high temperatures, internal pressures, and combustion debris over a short time period as well as withstand a high exterior impact load from the impulse cartridge. Typically, the ignition sequencer is a single use part that is ejected from the flare after ignition. The ignition sequencer must contain and survive an internal pyrotechnic event.

In conventional ignition sequencers there are additional assembly steps that must follow the loading of the explosive compound. Because of the PPE and processes that must be followed when working with explosive material, these assembly steps involving small pieces is problematic, time consuming, and costly. One embodiment of the ignition sequencer of the present disclosure eliminates the need to perform any additional assembly steps following the installation of the energetic material due in part to its inseparable two part design of a body and an armature.

Figure 2A:
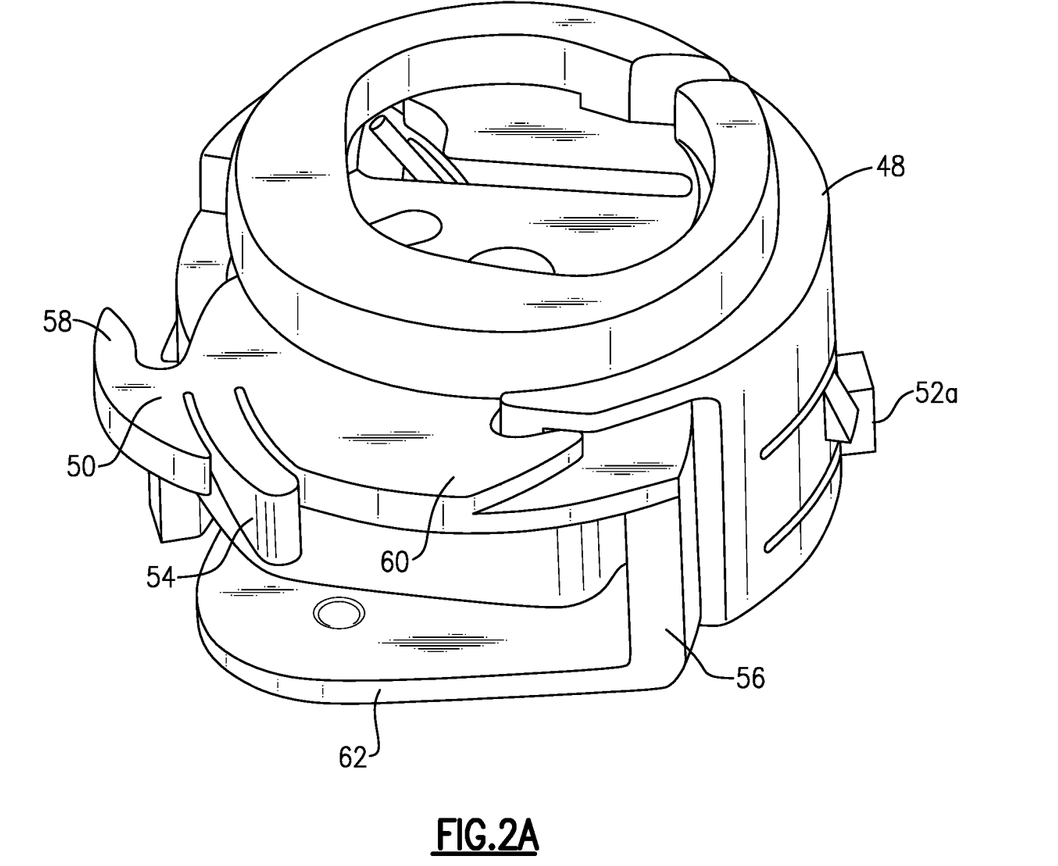
FIG. 2A is a first top perspective view of one embodiment of an ignition sequencer of the present disclosure in an energetic load position.

Referring to FIG. 2A, a first top perspective view of one embodiment of an ignition sequencer of the present disclosure in an energetic load position is shown. More specifically, the ignition sequencer comprises a body 48 and an armature 50. These pieces are formed together using additive manufacturing techniques. In this view, it is possible to see a top plate 60 and a bottom plate 62 of the armature portion 50. An armature lever 56 is configured to be connected to both the top plate 60 and the bottom plate 62. The body 48 has one of two retention flexures 52a visible in this orientation. Also visible are the spring catch 58 and a lock 54 connected to the top plate of the armature 50.

In some cases, the body 48 and the armature are additively manufactured out of the same material. In some cases, they comprise different materials. In one embodiment, a nylon 12 polyamide powder is used. In some embodiments, polyamide-12 and glass-reinforced polyamide-12 are used. A carbon-fiber reinforced polyamide-12 material or even a metal material could be suitable/producible for certain applications.

Figure 2B:
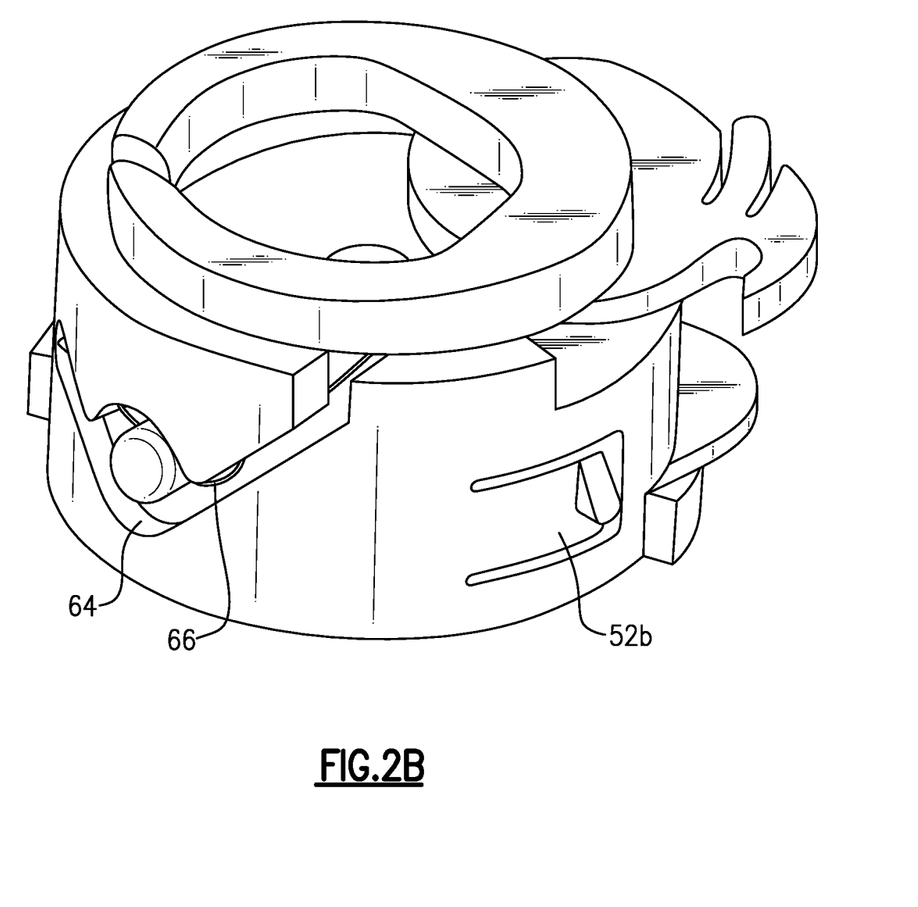
FIG. 2B is a second top perspective view of one embodiment of an ignition sequencer of the present disclosure in an energetic load position.

Referring to FIG. 2B, a second top perspective view of one embodiment of an ignition sequencer of the present disclosure in an energetic load position is shown. More specifically, in this rotated orientation with respect to FIG. 2A, the second of the two retention flexures 52b is visible. Additionally, the spring slot 64, with a spring 66 inside is also visible. Certain embodiments of the ignition sequencer of the present disclosure are comprised of only two separable parts. In this case, the body and armature make up one inseparable piece that has portions (body and armature) that are articulable/moveable with respect to each other. In this embodiment, the spring is the second separable part. In some cases, the spring is shipped in an un-compressed fashion to be installed at a later time.

Figure 3A:
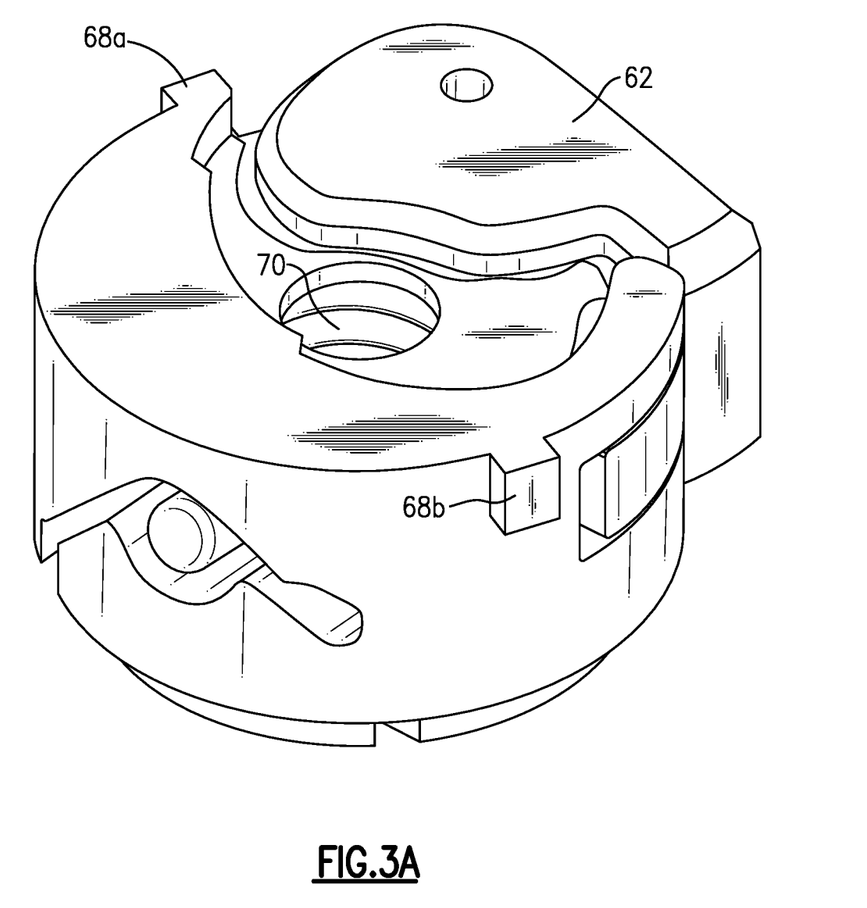
FIG. 3A is a first bottom perspective view of one embodiment of an ignition sequencer of the present disclosure in an energetic load position.

Referring to FIG. 3A, a first bottom perspective view of one embodiment of an ignition sequencer of the present disclosure in an energetic load position is shown. More specifically, two clocking keys 68a, 68b are shown on the body portion of the ignition sequencer of the present disclosure. Additionally, the energetic well 70 is viewable from the bottom side of the ignition sequencer. The bottom plate 62 is also visible in this orientation.

Figure 3B:
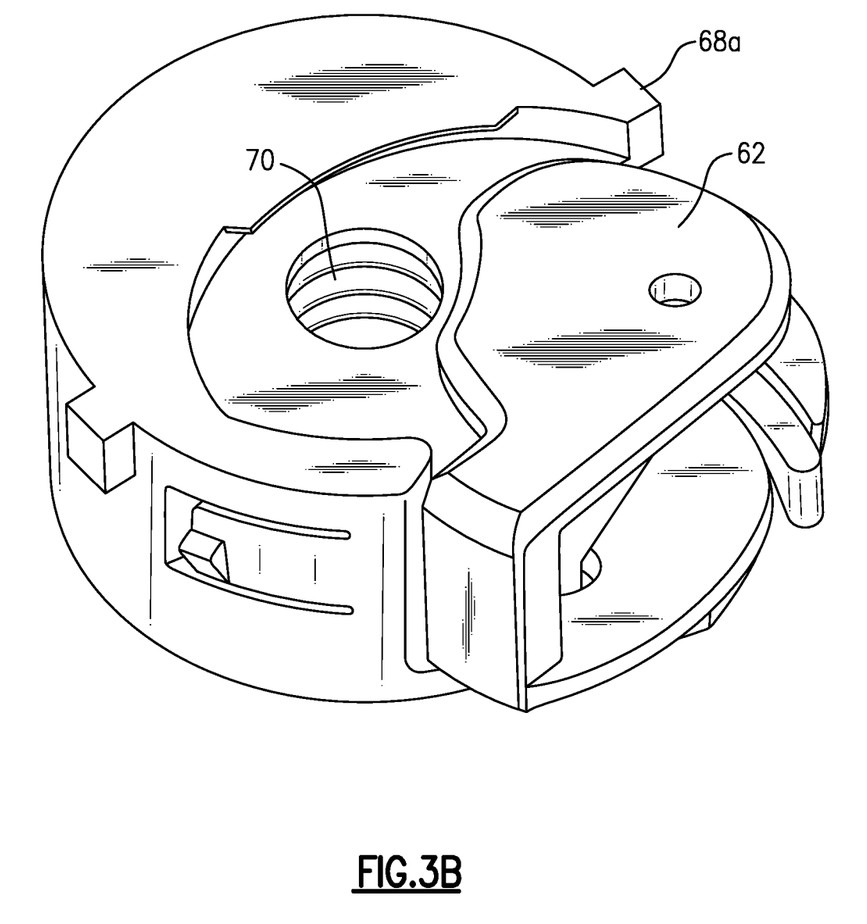
FIG. 3B is a second bottom perspective view of one embodiment of an ignition sequencer of the present disclosure in an energetic load position.

Referring to FIG. 3B, a second bottom perspective view of one embodiment of an ignition sequencer of the present disclosure in an energetic load position is shown. More specifically, in this rotated view with respect to FIG. 3A complex corrugated and textured geometries within the energetic well 70 are visible. These are designed to retain the internal energetic charge, and are made possible only through the use of additive manufacturing techniques and cannot be created with traditional methods like machining, molding, or casting.

Figure 4A:
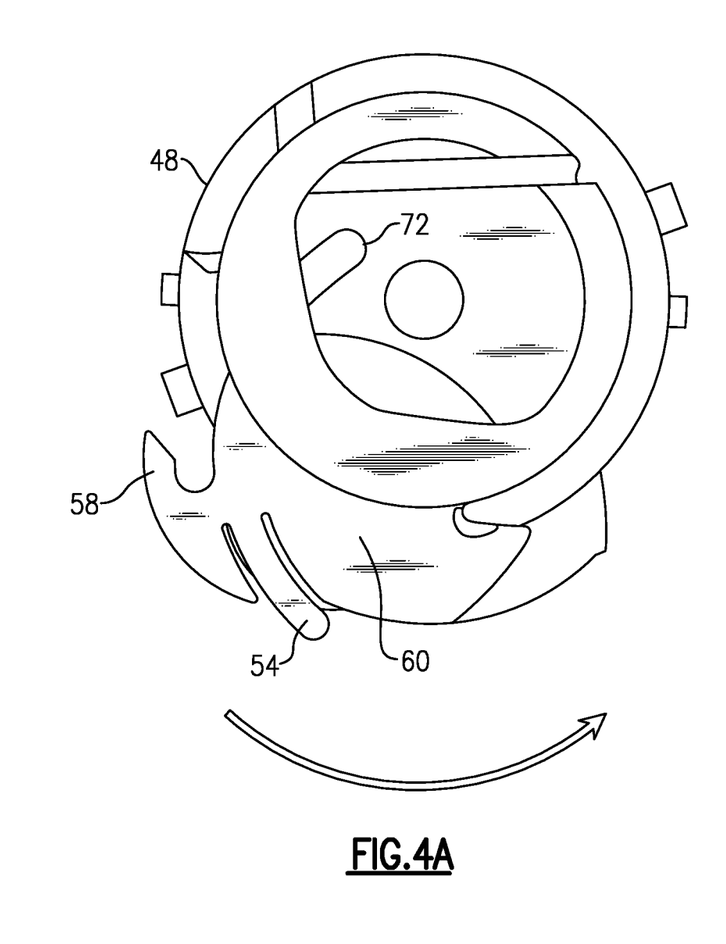
FIG. 4A is a top plan view of one embodiment of an ignition sequencer of the present disclosure in an energetic load position.
Figure 4B:
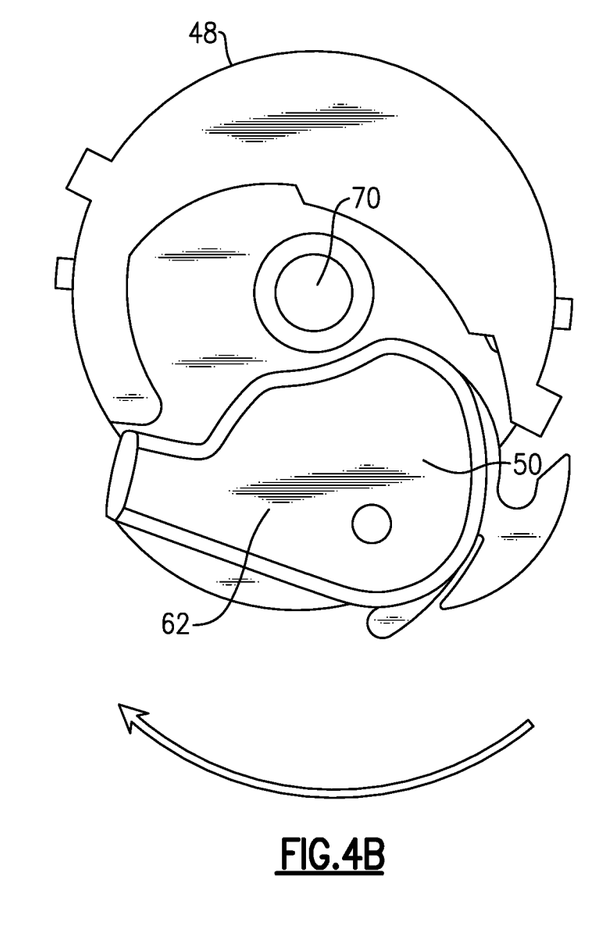
FIG. 4B is a bottom plan view of one embodiment of an ignition sequencer of the present disclosure in an energetic load position.

Referring to FIG. 4A, a top plan view of one embodiment of an ignition sequencer of the present disclosure in an energetic load position is shown. More specifically, the arrows below FIG. 4A and FIG. 4B are both pointing towards the direction of the armature 50 being completely open in the energetic load position. Also visible in FIG. 4A is a guide slot 72. Referring to FIG. 4B, a bottom plan view of one embodiment of an ignition sequencer of the present disclosure in an energetic load position is shown. More specifically, the energetic well 70 is completely unobstructed by the bottom plate when in the energetic load position. This allows for the insertion of the internal energetic charge, from the bottom FIG. 4B, with the armature paddles assembled to the sequencer body. This is in contrast to designs of the prior art and significantly reduces the touch labor associated with assembly and functionalization.

Figure 5A:
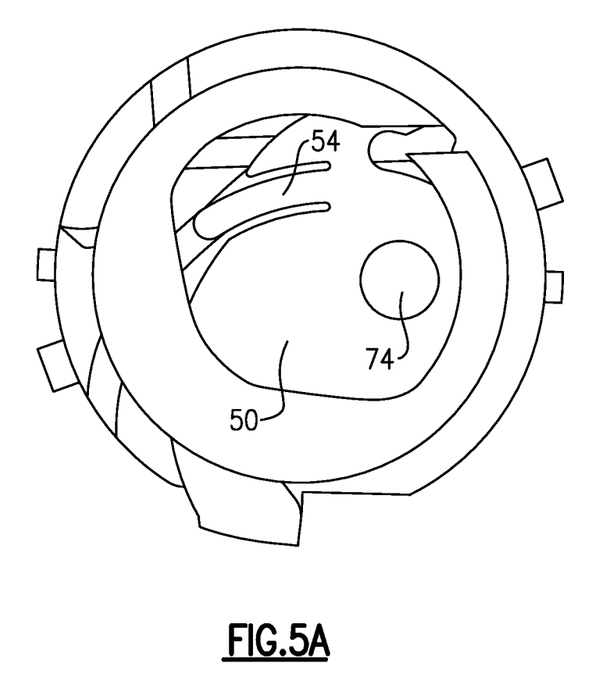
FIG. 5A is a top plan view of one embodiment of an ignition sequencer of the present disclosure in an ignite position.

Referring to FIG. 5A, a top plan view of one embodiment of an ignition sequencer of the present disclosure in an "ignite" position is shown. More specifically, when visualizing this embodiment of the ignition sequencer moving from energetic load position (FIG. 4A or FIG. 4B) through an ignite position (FIG. 5A or FIG. 5B) and finally to a fire position (FIG. 5C or FIG. 5D) it is best to view the top view in FIG. 4A, FIG. 5A and FIG. 5C in series. As the armature 50 pivots about a point near the bottom of the body in the figures one can see that at first (e.g., in FIG. 4A) the spring catch 58 and lock 54 are visible outside the body 48. In FIG. 5A, the lock 54 is visible within the body and a top aperture 74 in the top plate of the armature becomes visible near an inner circumference of the body. In FIG. 5C, a top plan view of one embodiment of an ignition sequencer of the present disclosure in a "fire" position is shown. More specifically, it is possible to see that the armature rebounds back, under spring load, and locks into a fire position with the top aperture 74 aligned with an energetic well 70 in the body and the lock 54 is within the guide slot 72.

Figure 5B:
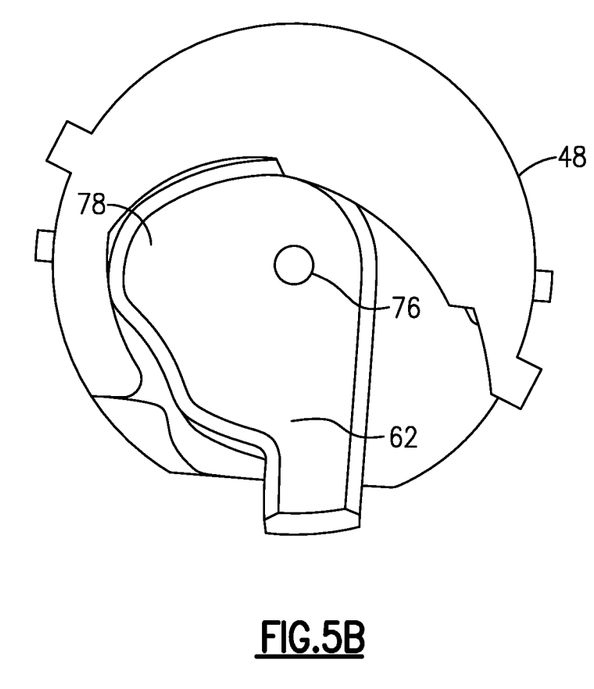
FIG. 5B is a top plan view of one embodiment of an ignition sequencer of the present disclosure in an ignite position.
Figure 5C:
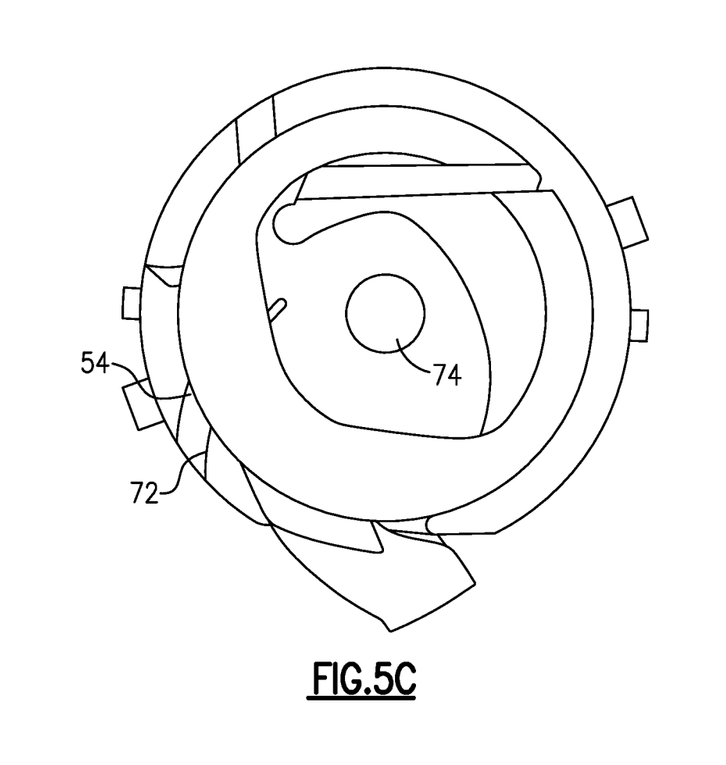
FIG. 5C is a top plan view of one embodiment of an ignition sequencer of the present disclosure in a fire position.
Figure 5D:
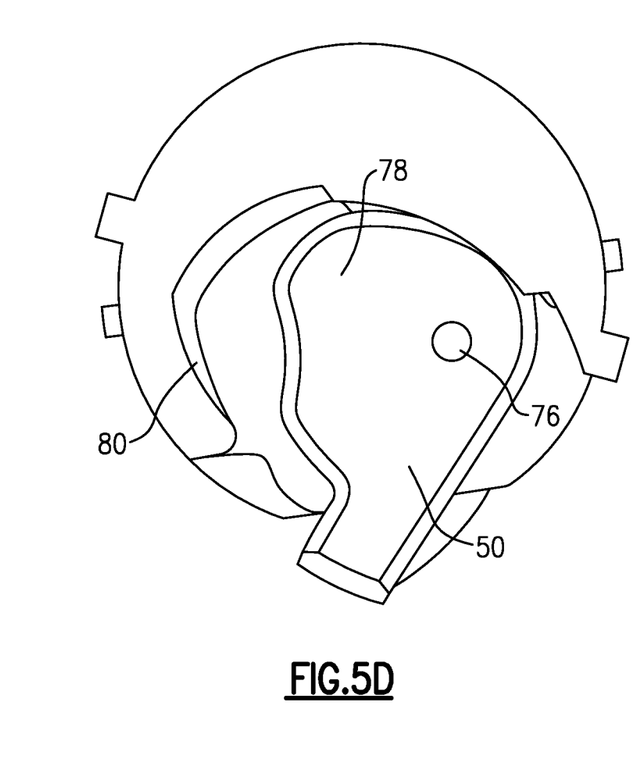
FIG. 5D is a top plan view of one embodiment of an ignition sequencer of the present disclosure in a fire position.

Referring to FIG. 5B, a top plan view of one embodiment of an ignition sequencer of the present disclosure in an "ignite" position is shown. More specifically, when visualizing this embodiment of the ignition sequencer moving from energetic load position (FIG. 4A or FIG. 4B) through an ignite position (FIG. 5A or FIG. 5B) and finally to a fire position (FIG. 5C or FIG. 5D) it is best to view the bottom view in FIG. 4B, FIG. 5B and FIG. 5D in series. As the armature 50 pivots about a point near the bottom of the body 48 in the figures one can see that at first the bottom plate 62 extends partially beyond the outer circumference of the body (see, e.g., FIG. 4B). The energetic well 70 is viewable from the bottom side of the ignition sequencer. In FIG. 5B, in the "ignite" position, a bottom aperture 76 in the bottom plate is aligned with the center aperture (i.e., energetic well) in the body (70 as shown in FIG. 4A) and the bottom plate 62 is almost entirely within the body 48 such that a lobed portion 78 of the bottom plate 62 abuts an inner wall of the body. Referring to FIG. 5D, a top plan view of one embodiment of an ignition sequencer of the present disclosure in a "fire" position is shown. More specifically, it is possible to see that the armature 50 rebounds back and locks into fire position with the bottom aperture 76 in the bottom plate is no longer aligned with the center aperture in the body and the lobed portion 78 is now some distance away from the inner wall 80 of the body.

When the impulse cartridge is fired, the radial disk is fractured, breaking the seal of the flare canister. Gases from the fired cartridge then expand to exert a pushing force against the piston and backer. This removes a disk and ejects the flare assembly. As the piston and backer strike the sequencer and body the flare assembly is moved upwards in the canister. The sequencer is in the ignite position FIG. 5A and FIG. 5B. In this position the main grain of the flare is blocked from the impulse cartridge gasses/flame and the bottom is open to accept the energy. The flame and hot gasses from the impulse cartridge ignite the sequencer while it is inside the canister. When the flare assembly leaves the canister/platform the torsion spring in the sequencer actuates, switching it into the fire position FIG. 5C and FIG. 5D. In this position the bottom of the sequencer is blocked off, forcing all of the energetic energy into the main energetic grain. When the main grain is lit, the energy from the ignition will fire back towards the sequencer causing it to shear off. While there is no difference in functionality/timing between the old and new sequencer designs, the old version used four linear springs and thirteen parts to do the same actuation of transferring the energy from the impulse cartridge to the flare grain.

Figure 6:
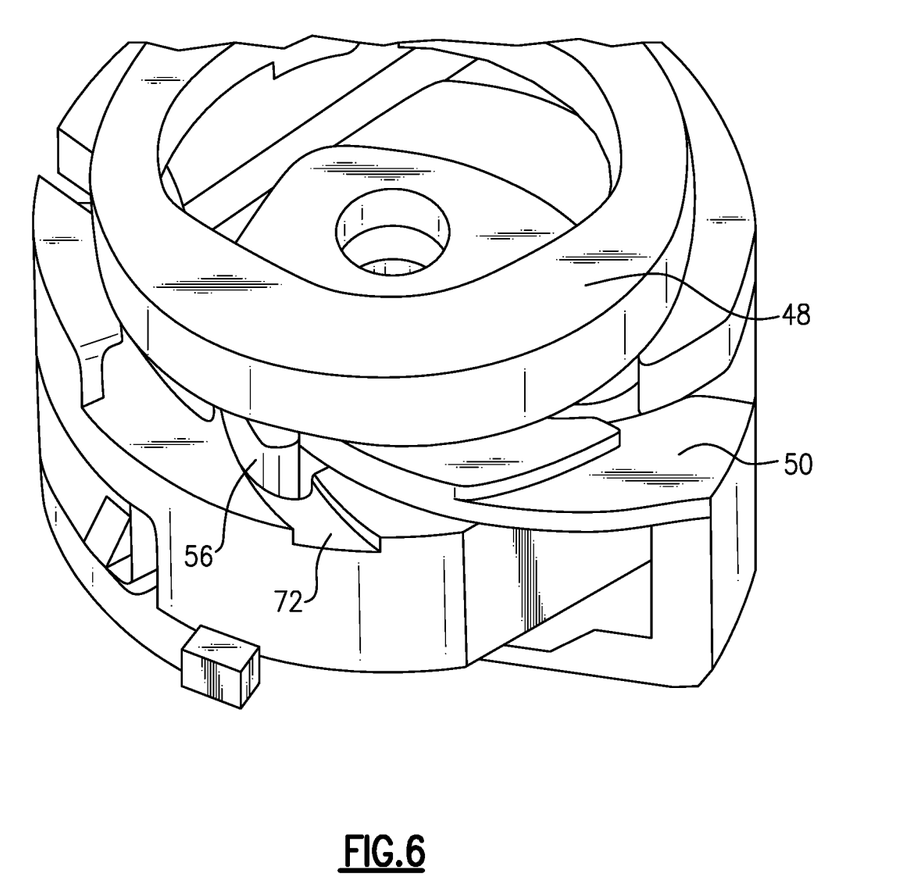
FIG. 6 is a perspective view of one embodiment of an ignition sequencer of the present disclosure showing an integrated armature locking feature.

Referring to FIG. 6, a perspective view of one embodiment of an ignition sequencer of the present disclosure showing an armature lock position is shown. More specifically, the armature lock 54 engages with the guide slot 72 in the fire position and prevent further access to an energetic load position.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. An ignition sequencer assembly, comprising:
    a body comprising a guide slot and an energetic well; and
    an armature, wherein the armature is captively contained by the body and exhibits relative articulating motion with respect thereto and comprises a single, monolithic, paddle structure which acts to open and close two or more ignition apertures;
    the armature having a top plate, the top plate comprising:
        a top aperture;
        a lock for slidably engaging with the guide slot; and
        a spring catch;
    a bottom plate, the bottom plate comprising:
        a lobed portion; and
        a bottom aperture; and
    a lever, wherein the lever connects the top plate to the bottom plate.

2. The ignition sequencer assembly according to claim 1, wherein the body and the armature are additively-manufactured.

3. The ignition sequencer assembly according to claim 2, wherein the ignition sequencer assembly architecture allows for the existence of two or more distinct stages of the ignition sequence through the articulating motion of the additively-manufactured armature.

4. The ignition sequencer assembly according to claim 1, wherein the body is additively-manufactured from a polyamide material.

5. The ignition sequencer assembly according to claim 1, wherein the armature is additively-manufactured from a polyamide material.

6. The ignition sequencer assembly according to claim 1, wherein the ignition sequencer assembly architecture allows for installation of an internal energetic compound while all components are assembled and interconnected.

7. The ignition sequencer assembly according to claim 1, wherein the ignition sequencer assembly architecture allows for installation into a next higher-level assembly using a single, uniaxial, force.

8. The ignition sequencer assembly according to claim 7, wherein integral flexure locking features retain the ignition sequencer assembly in the next higher level assembly.

9. The ignition sequencer assembly according to claim 1, wherein the ignition sequencer assembly comprising features designed to limit accessible positions of relative motion between the body and the armature during operation.

10. The ignition sequencer assembly according to claim 1, wherein when the ignition sequencer is in an energetic load position the energetic well is unobstructed by the top and bottom apertures.

11. The ignition sequencer assembly according to claim 1, wherein when the ignition sequencer is in an ignite position the bottom aperture is aligned with the energetic well and the lock is in the guide slot.

12. The ignition sequencer assembly according to claim 1, wherein when the ignition sequencer is in a fire position the top aperture is aligned with the energetic well and the lobed portion is some distance away from an inner wall of the body such that the bottom aperture is no longer aligned with the energetic well.

13. A method of using an ignition sequencer assembly, comprising:
    providing a body comprising a guide slot and an energetic well and an armature, wherein the armature is captively contained by the body;

articulating the armature with respect to the body, the armature comprising a single, monolithic, paddle structure the armature having a top plate, the top plate comprising:
  a top aperture;
  a lock for slidably engaging with the guide slot; and
  a spring catch;
a bottom plate, the bottom plate comprising:
  a lobed portion; and
  a bottom aperture; and
  a lever, wherein the lever connects the top plate to the bottom plate; and
opening and closing two or more ignition apertures with the articulating motion of the armature with respect to the body.

* * * * *